United States Patent [19]
Horiuchi

[11] Patent Number: 5,513,891
[45] Date of Patent: May 7, 1996

[54] REMOVABLE ROOF ACCOMMODATING STRUCTURE IN MIDSHIP-TYPE VEHICLE

[75] Inventor: Sumio Horiuchi, Wako, Japan

[73] Assignee: Honda Giken Kogyo Kabushiki Kaisha, Tokyo, Japan

[21] Appl. No.: 324,499

[22] Filed: Oct. 18, 1994

[30] Foreign Application Priority Data

Oct. 20, 1993 [JP] Japan .................................. 5-262437

[51] Int. Cl.⁶ ...................................................... B60R 9/06
[52] U.S. Cl. ......................... 296/37.1; 296/218; 180/297; 180/69.21; 224/328
[58] Field of Search ............................... 296/37.1, 37.16, 296/218, 76; 180/297, 69.2, 69.21; 224/328

[56] References Cited

U.S. PATENT DOCUMENTS

| 4,467,944 | 8/1984 | Manko et al. | 296/218 |
| 5,193,874 | 3/1993 | German et al. | 296/218 |
| 5,372,289 | 12/1994 | Dachicourt | 296/37.1 |

FOREIGN PATENT DOCUMENTS

| 4019121 | 1/1994 | Germany | 296/76 |
| 616745 | 2/1961 | Italy | 180/69.2 |
| 12439 | 1/1987 | Japan | 296/76 |
| 404358924A | 12/1992 | Japan | 296/218 |
| 405229347A | 9/1993 | Japan | 296/37.1 |

Primary Examiner—Gary C. Hoge
Attorney, Agent, or Firm—Nikaido, Marmelstein, Murray & Oram

[57] ABSTRACT

A midship-type vehicle, with an engine mounted in a rear portion of a vehicle body, includes an openable and closable maintenance lid covering an upper portion of an engine room, and an openable and closable rear glass gate covering an upper portion of the maintenance lid. The maintenance lid includes a lower lid body and an upper cover, both of which are pivotally supported by a common pivot. A removable roof accommodating space is defined between the lid body and the cover. After opening the rear glass gate, only the cover is opened to conduct the removal and accommodation of the roof, or the lid body and the cover are opened simultaneously to conduct maintenance on the engine. Thus, it is possible to accommodate the roof, which has been removed from the vehicle body, without sacrificing any volume in a trunk or a passenger compartment.

11 Claims, 17 Drawing Sheets

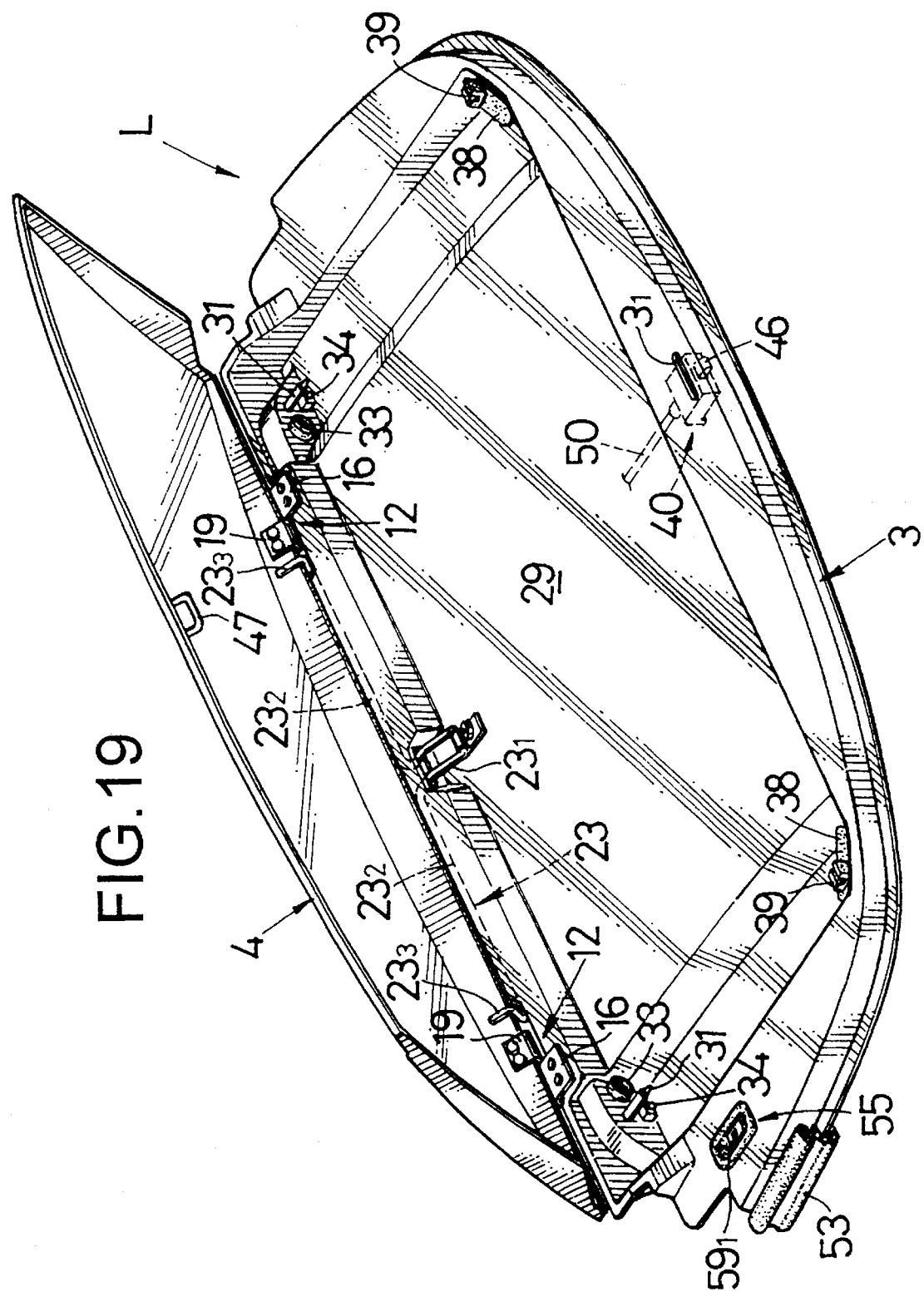

5,513,891

REMOVABLE ROOF ACCOMMODATING STRUCTURE IN MIDSHIP-TYPE VEHICLE

BACKGROUND OF THE INVENTION

1. Field of the Invention

The present invention relates to a removable roof accommodating structure for accommodating a removable roof removed from a vehicle body, and particularly to a removable roof accommodating structure in a midship-type vehicle, including a maintenance lid capable of opening and closing, an engine mounted in a rear portion of a vehicle body, and a rear gate capable of opening and closing. The engine is covered at an upper portion thereof with the maintenance lid, and the maintenance lid is covered at an upper portion thereof with the rear gate.

2. Description of the Prior Art

In the prior art, the removable roof removed from the vehicle body is usually accommodated or received in a space in a trunk. The removable roof is directly fixed within the trunk, or fixed on a lower surface of a trunk lid covering the trunk (for example, see Japanese Utility Model Application Laid-open Nos. 9767/80 and 91718/87 and Japanese Utility Model Publication No. 37294/89).

However, if the removable roof is accommodated in the trunk, the effective volume of the trunk is sacrificed and thus, other objects can not be accommodated. Particularly, in a case of a midship-type vehicle including an engine mounted in a rear portion of a vehicle body, it is originally difficult to insure a sufficient volume in a trunk. Therefore, a big problem has been how to reduce the volume needed to accommodate the removable roof in the trunk.

SUMMARY OF THE INVENTION

Accordingly, it is an object of the present invention to accommodate a removable roof by utilizing a maintenance lid covering an upper portion of an engine in a midship-type vehicle with the engine mounted in a rear portion of a vehicle body.

To achieve the above object, according to a first aspect and feature of the present invention, there is provided a removable roof accommodating structure in a midship-type vehicle, comprising a maintenance lid capable of opening and closing, an engine mounted in a rear portion of a vehicle body, and a rear gate capable of opening and closing. The engine is covered at an upper portion thereof with the maintenance lid, and the maintenance lid is covered at an upper portion thereof with the rear gate. The maintenance lid is comprised of a lower lid body and an upper cover, each of which is pivotally supported by a hinge for opening and closing independently. A removable roof accommodating space is formed between the lower lid body and the upper cover for accommodating a removable roof removed from the vehicle body.

With the first feature, it is possible to accommodate the removable roof without sacrificing the volume of the trunk or a passenger compartment. Moreover, since the lower lid body and the upper cover are pivotally supported by the hinges, such that they can be opened and closed independently, it is possible to open only the cover so as to accommodate the removable roof or take it out, and to open both the lid body and the cover simultaneously to conduct maintenance on the engine.

In addition to the first feature, according to a second aspect and feature of the present invention, the upper cover is biased in an opening direction with respect to the lower lid body. With the second feature, it is possible to easily swing the upper cover toward its opened position.

In addition to the first feature, according to a third aspect and feature of the present invention, the hinge includes a stopper for defining an open-limit position for the lower lid body and the upper cover. With the third feature, it is possible to stably retain the lower lid body and the upper cover at their open-limit positions.

In addition to the first feature, according to a fourth aspect and feature of the present invention, the structure further includes a locking mechanism for fixing the upper cover to the lower lid body. With the fourth feature, it is possible to reliably prevent a deflection of the upper cover during traveling of the vehicle on a bad road and the like.

In addition to the first feature, according to a fifth aspect and feature of the present invention, the outer periphery of the upper cover is in abutment against the lower lid body with a sealing member interposed therebetween. With the fifth feature, it is possible to thermally insulate the roof accommodating space to protect the removable roof accommodated in the roof accommodating space against thermal damage.

The above and other objects, features and advantages of the invention will become apparent from the following description of a preferred embodiment taken in conjunction with the accompanying drawings.

BRIEF DESCRIPTION OF THE DRAWINGS

FIG. 19 is a perspective view of a maintenance lid.

DESCRIPTION OF THE PREFERRED EMBODIMENT

The present invention will now be described by way of a preferred embodiment in connection with the accompanying drawings.

Figure 1:
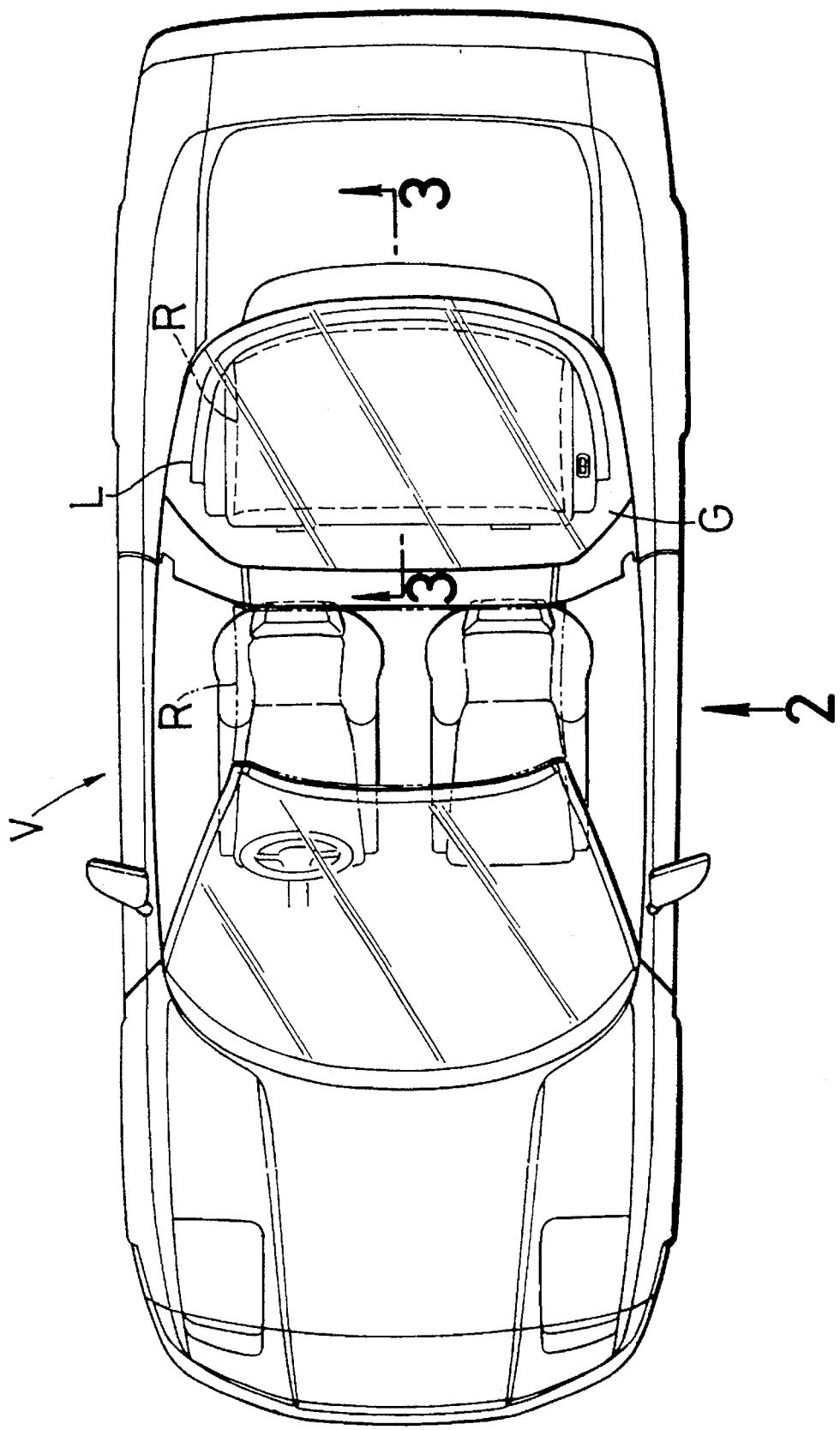
FIG. 1 in a plan view of the entire vehicle including a removable roof.
Figure 2:
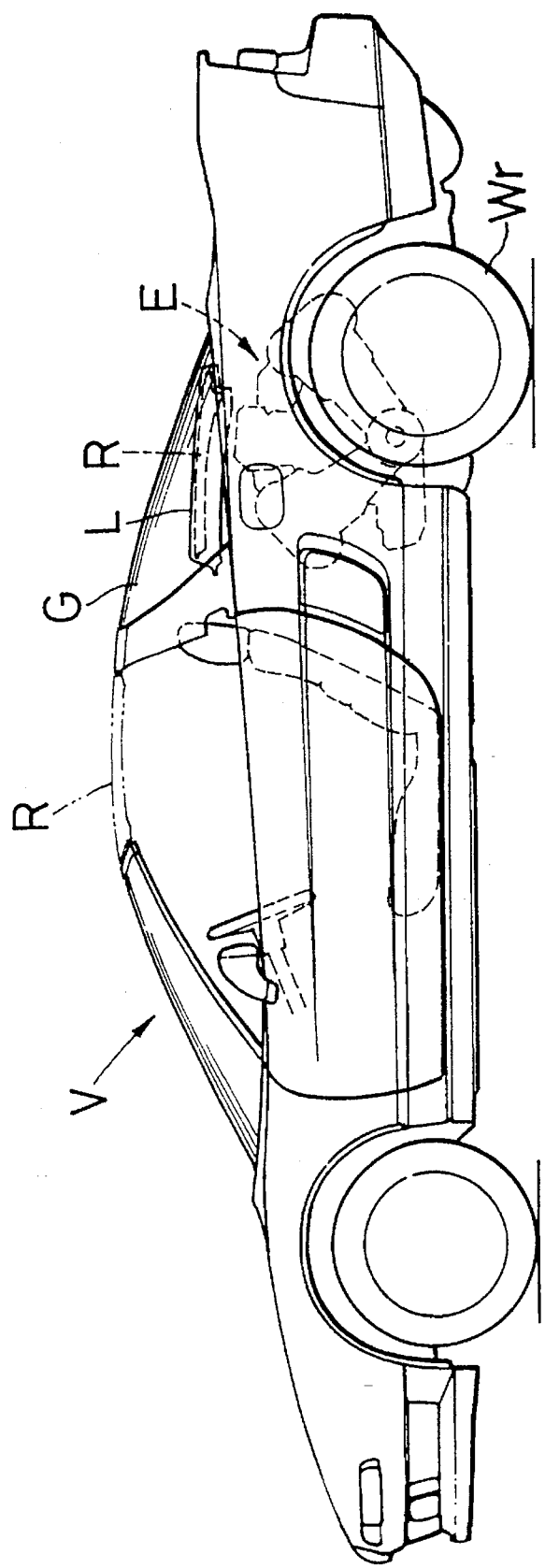
FIG. 2 is a view taken in a direction indicated by an arrow 2 in FIG. 1.

FIGS. 1 and 2 show a so-called midship-type vehicle V including an engine E mounted at a location in front of rear wheels Wr disposed at a rear portion of a vehicle body. A rear glass gate G mounted at a rear portion of a cabin is openable and closable, and a maintenance lid L covering an upper portion of the engine is openable and closable, in order to conduct maintenance of the engine E. The vehicle V includes a removable roof R attachable to and detachable from the vehicle body. The removable roof R, when removed from the vehicle body, is accommodated within the maintenance lid L. When the roof R is accommodated within the maintenance lid L, the roof R is reversed longitudinally, such that its front edge is turned rearwardly. This causes the front edge of the roof R, which is formed into a curved-shape, to fit smoothly along rear edges of the maintenance lid L and the rear glass gate G, which is also formed into a similar curved-shape, so that the roof R can be accommodated in a compact manner.

Figure 3:
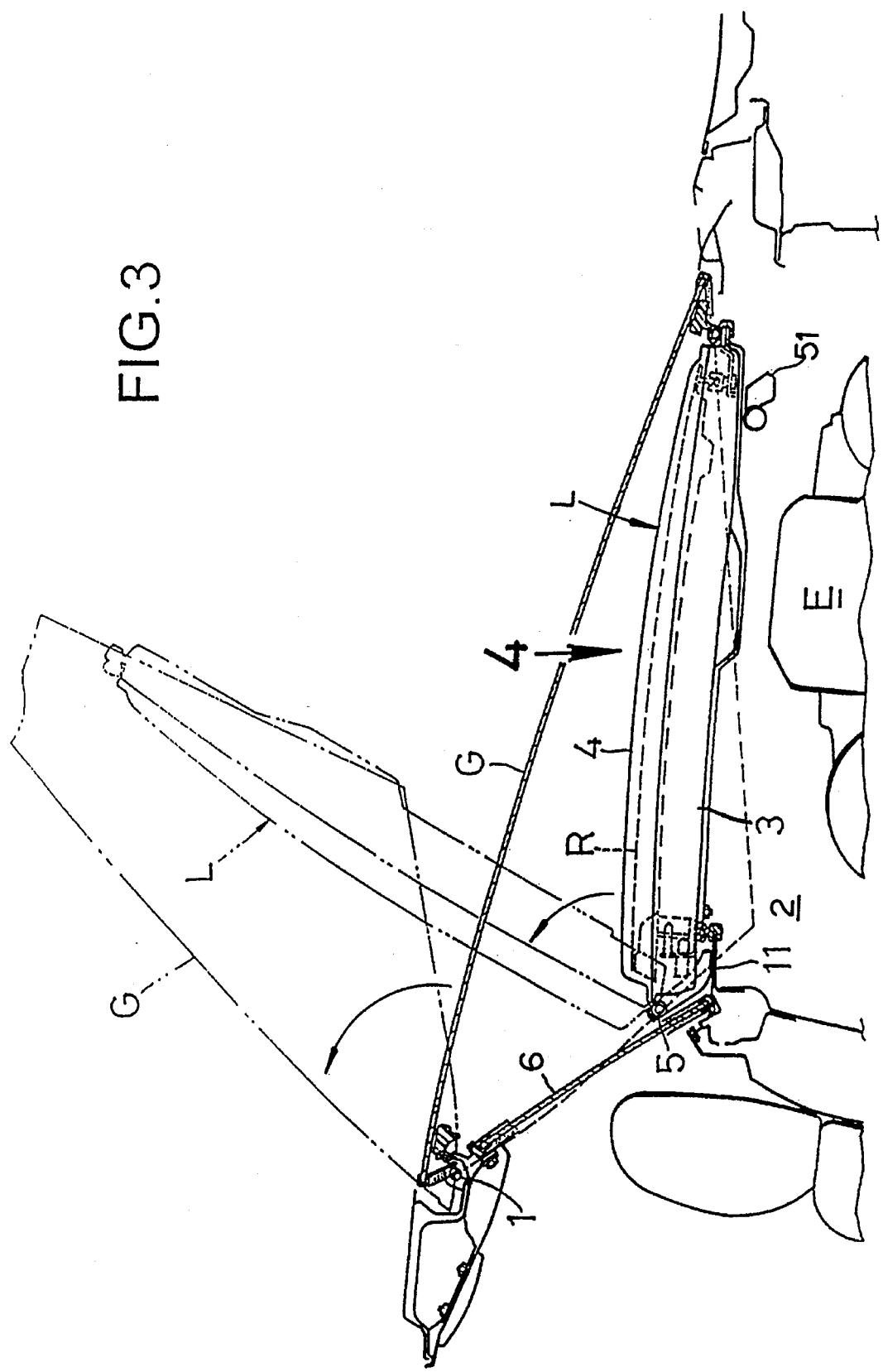
FIG. 3 is an enlarged sectional view taken along a line 3—3 in FIG. 1.
Figure 4:
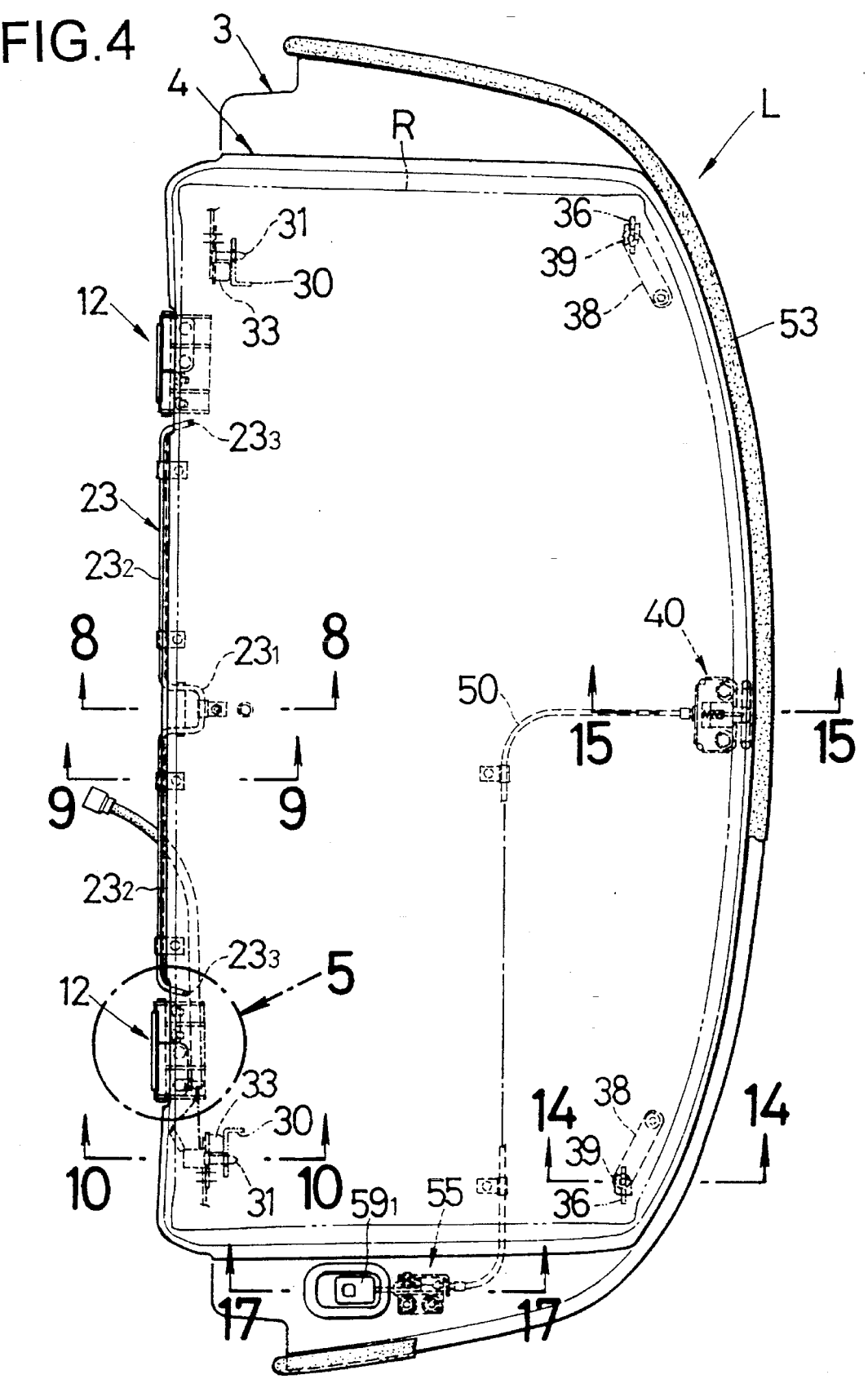
FIG. 4 is a view taken in a direction indicated by an arrow 4 in FIG. 3.
Figure 5:
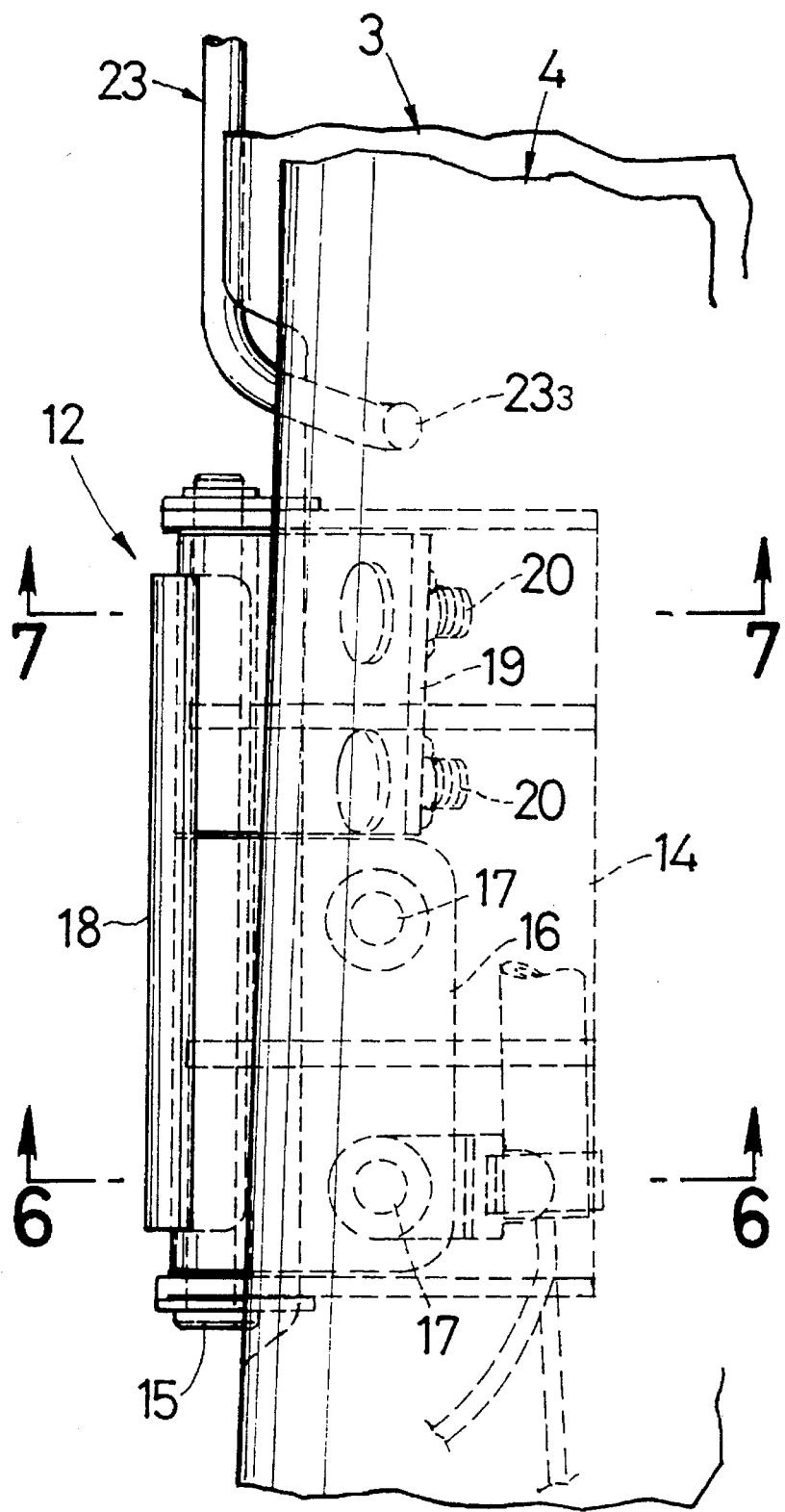
FIG. 5 is an enlarged view of an encircled portion indicated by 5 in FIG. 4.
Figure 6:
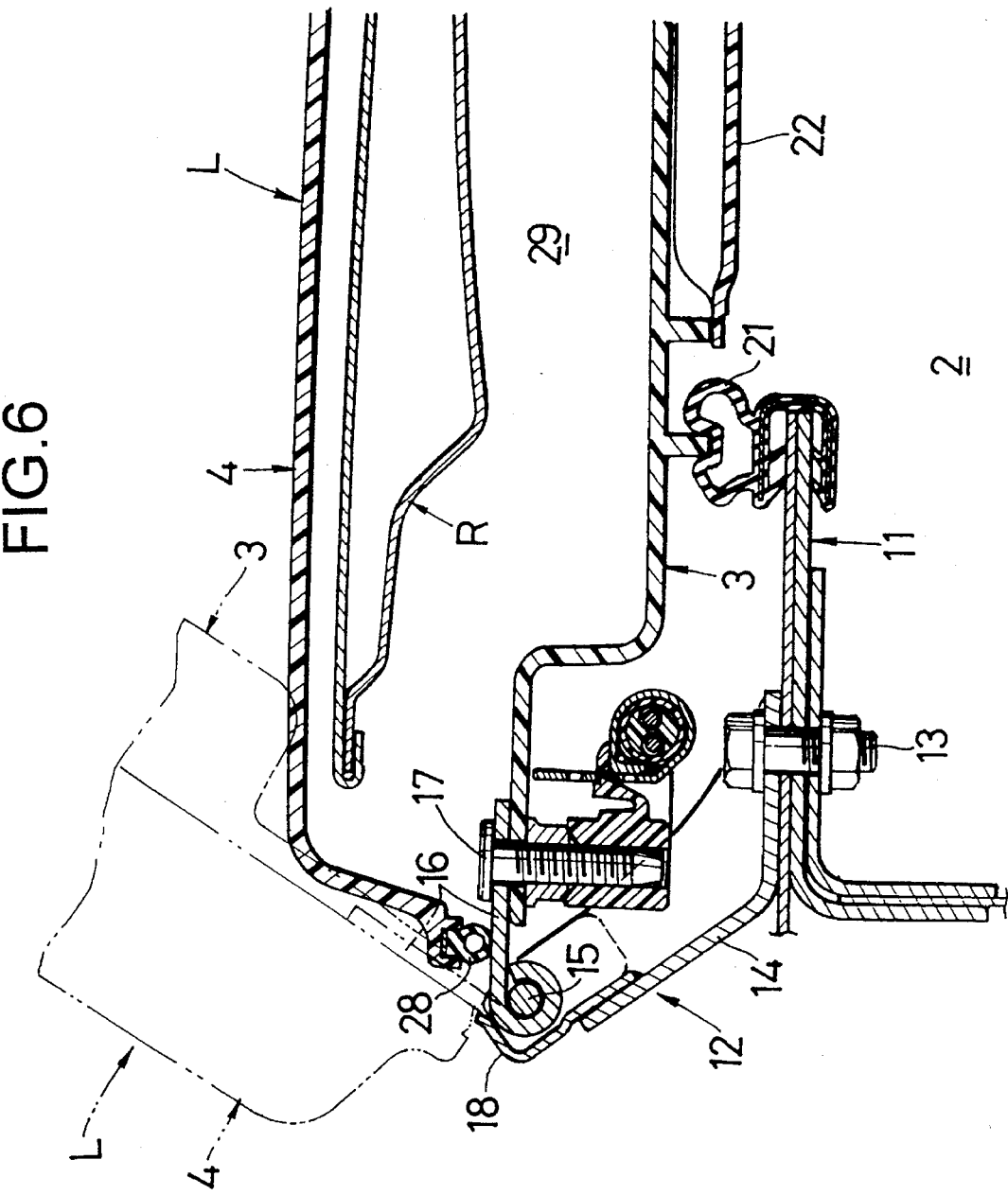
FIG. 6 in an enlarged sectional view taken along a line 6—6 in FIG. 5.
Figure 7:
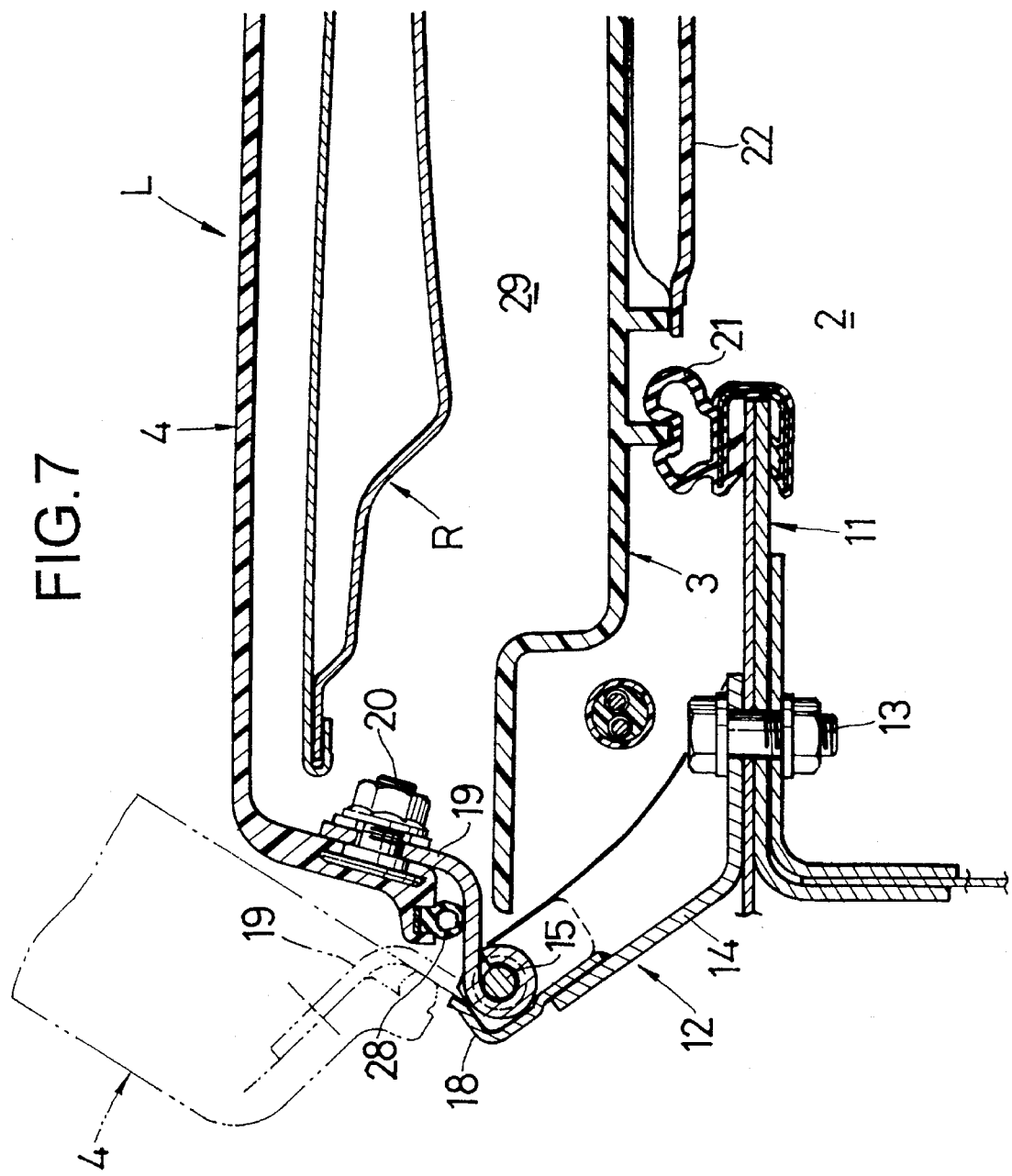
FIG. 7 ia an enlarged sectional view taken along a line 7—7 In FIG. 5.
Figure 8:
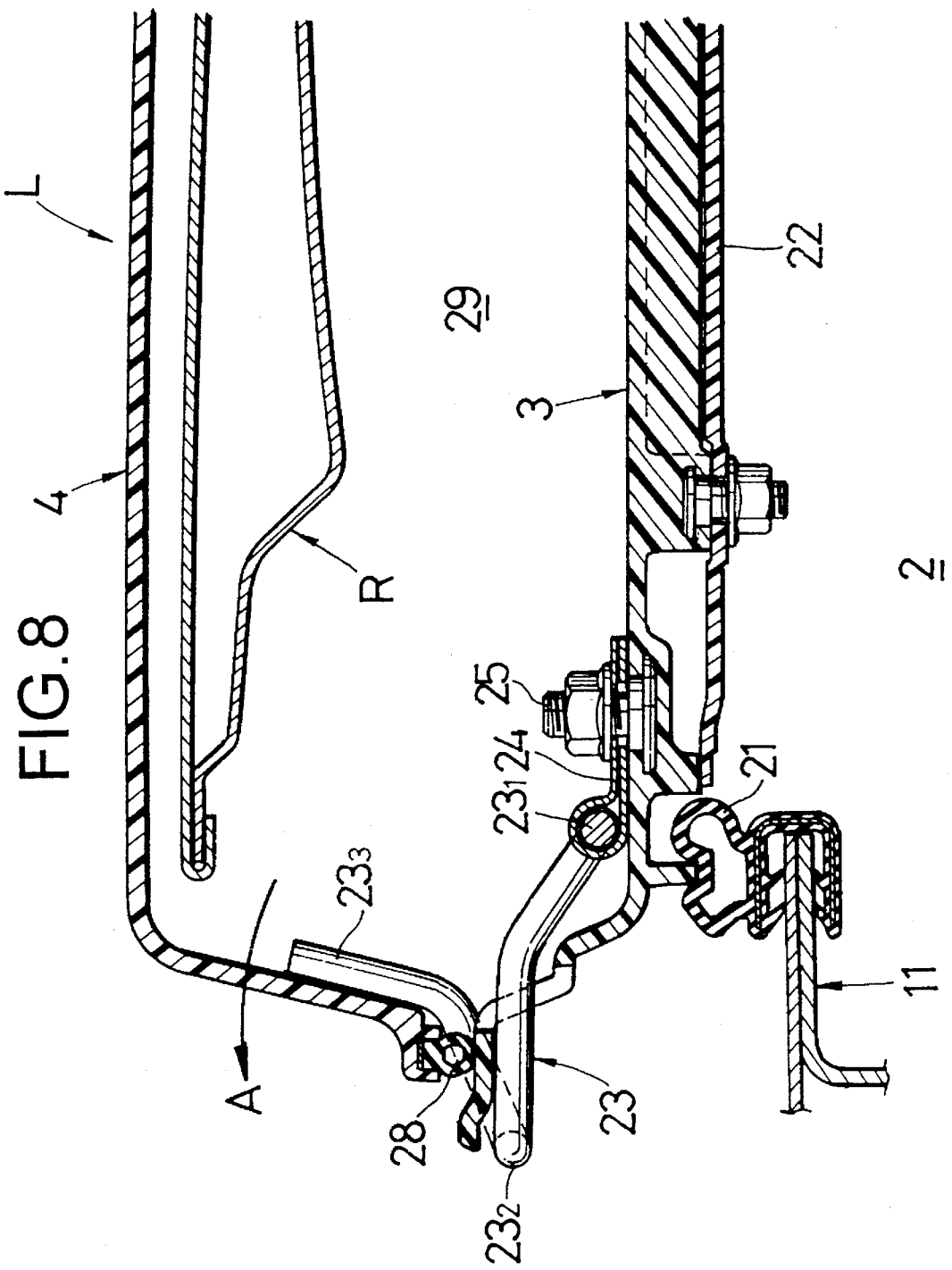
FIG. 8 is an enlarged sectional view taken along a line 8—8 In FIG. 4.
Figure 9:
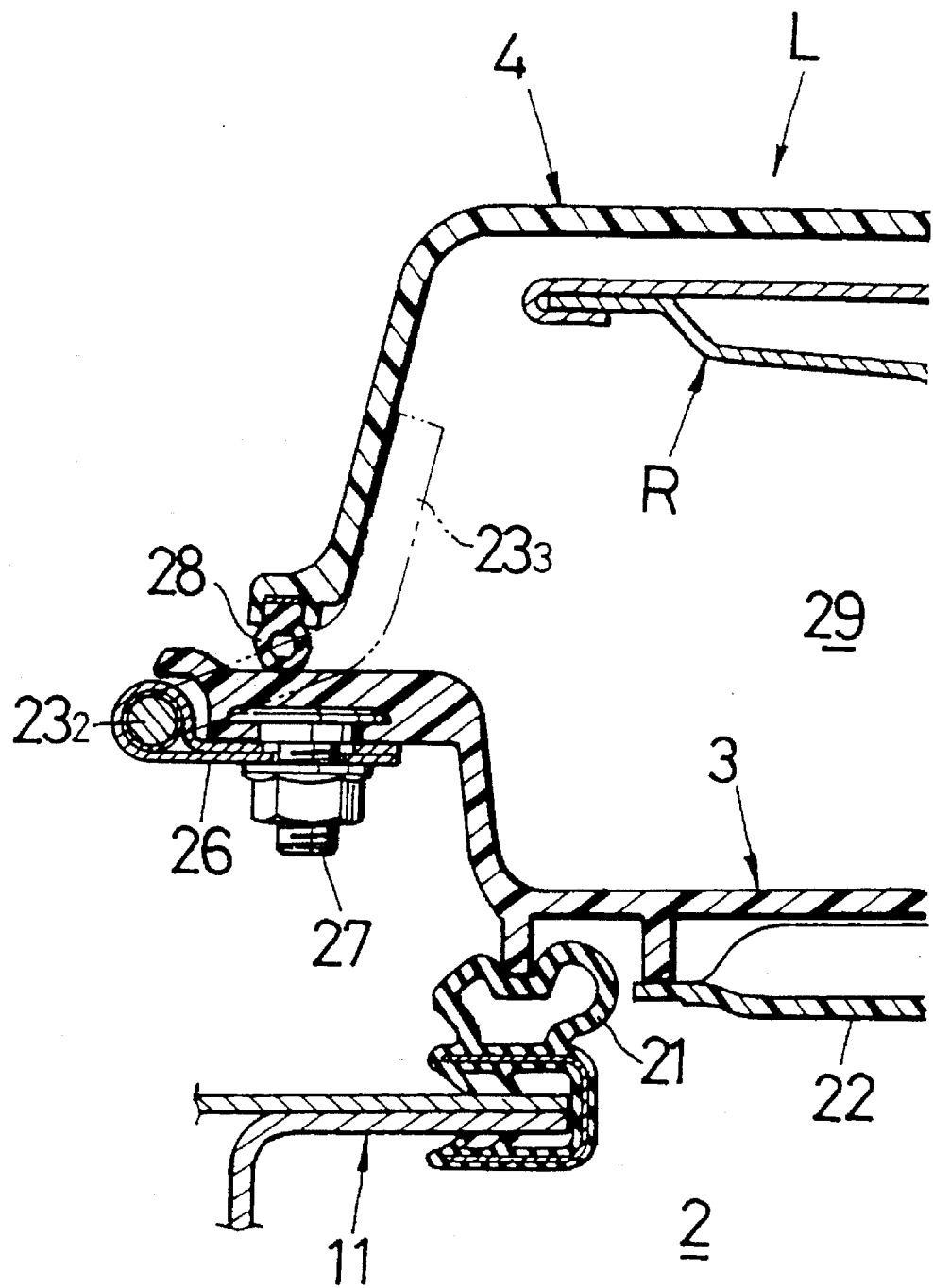
FIG. 9 is an enlarged sectional view taken along a line 9—9 in FIG. 4.
Figure 10:
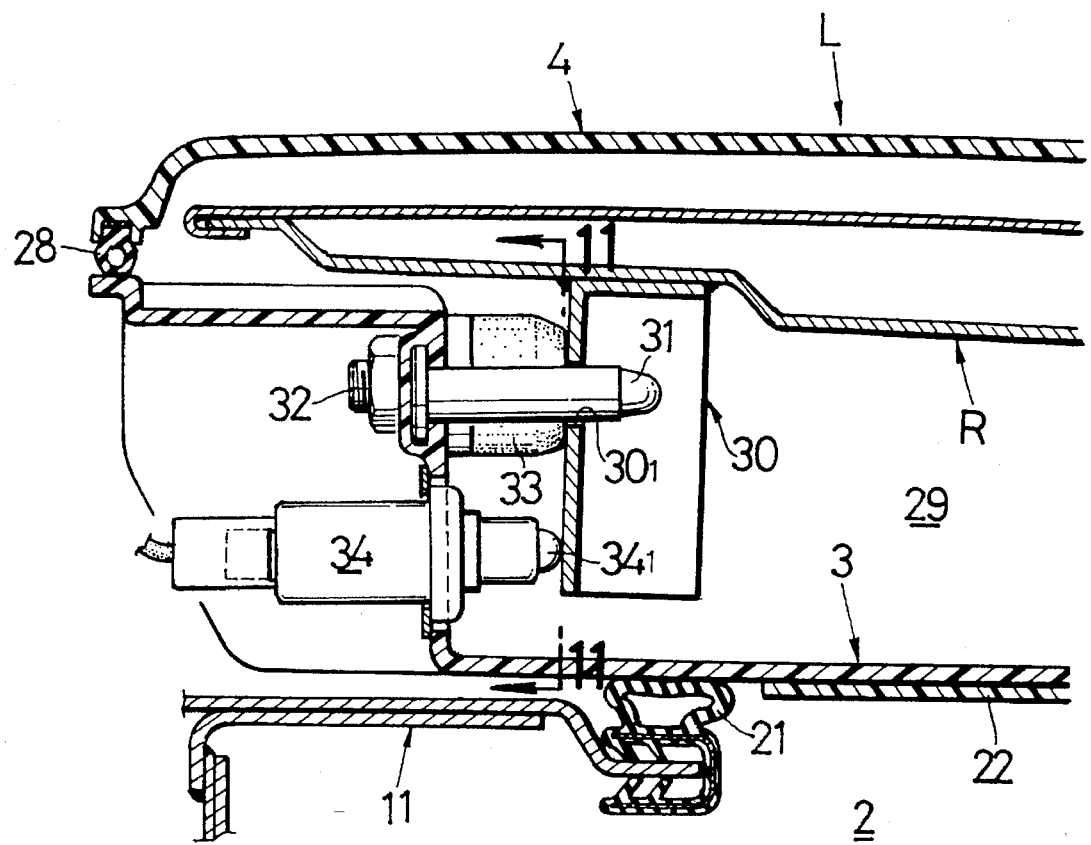
FIG. 10 is an enlarged sectional view taken along a line 10—10 in FIG. 4.
Figure 11:
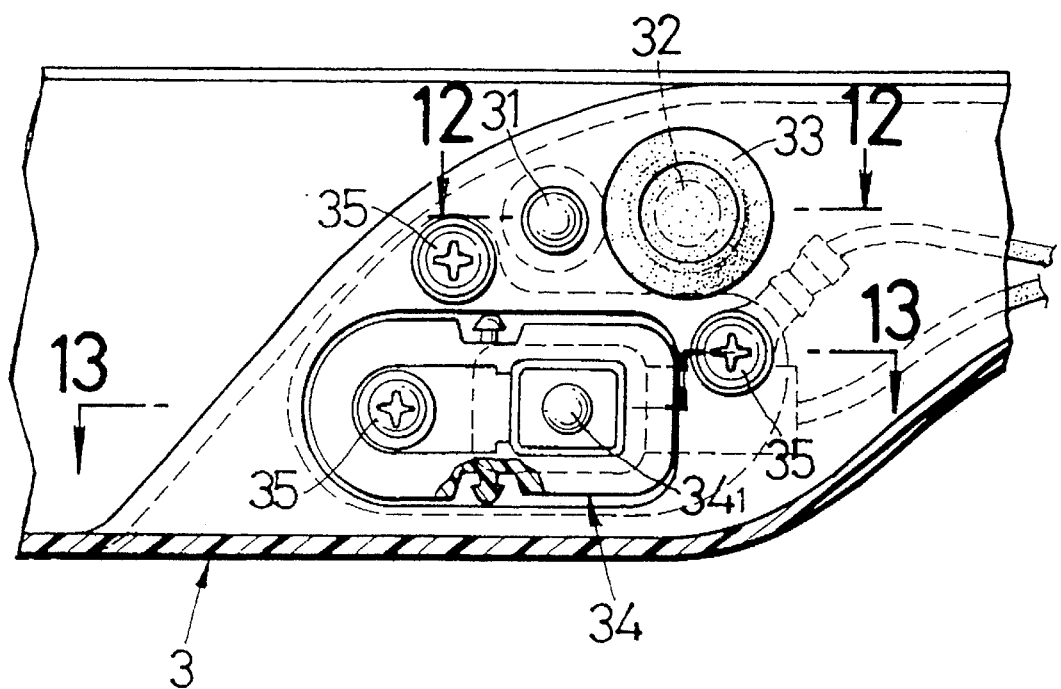
FIG. 11 is a sectional view taken along a line 11—11 in FIG. 10.
Figure 12:
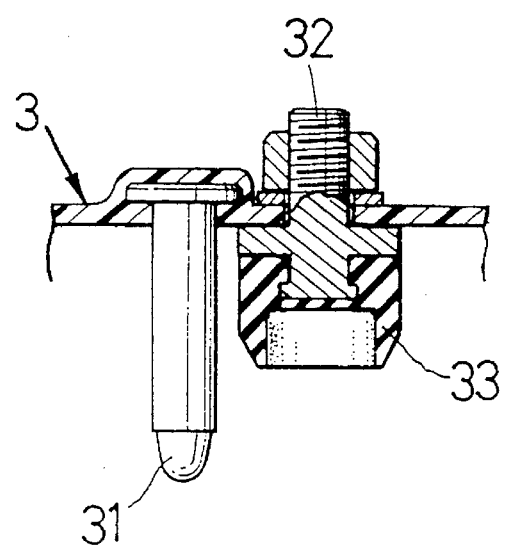
FIG. 12 is a sectional view taken along a line 12—12 in FIG. 11.
Figure 13:
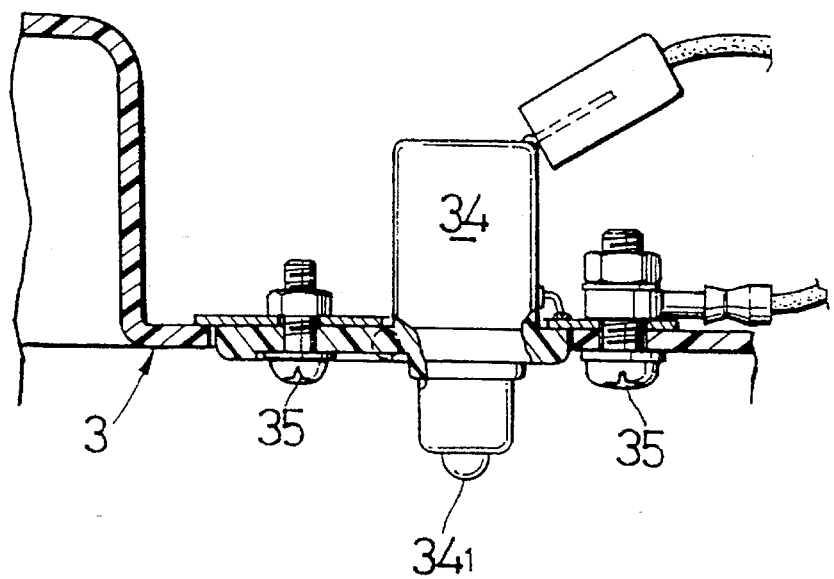
FIG. 13 is a sectional view taken along a line 13—13 in FIG. 11.
Figure 14:
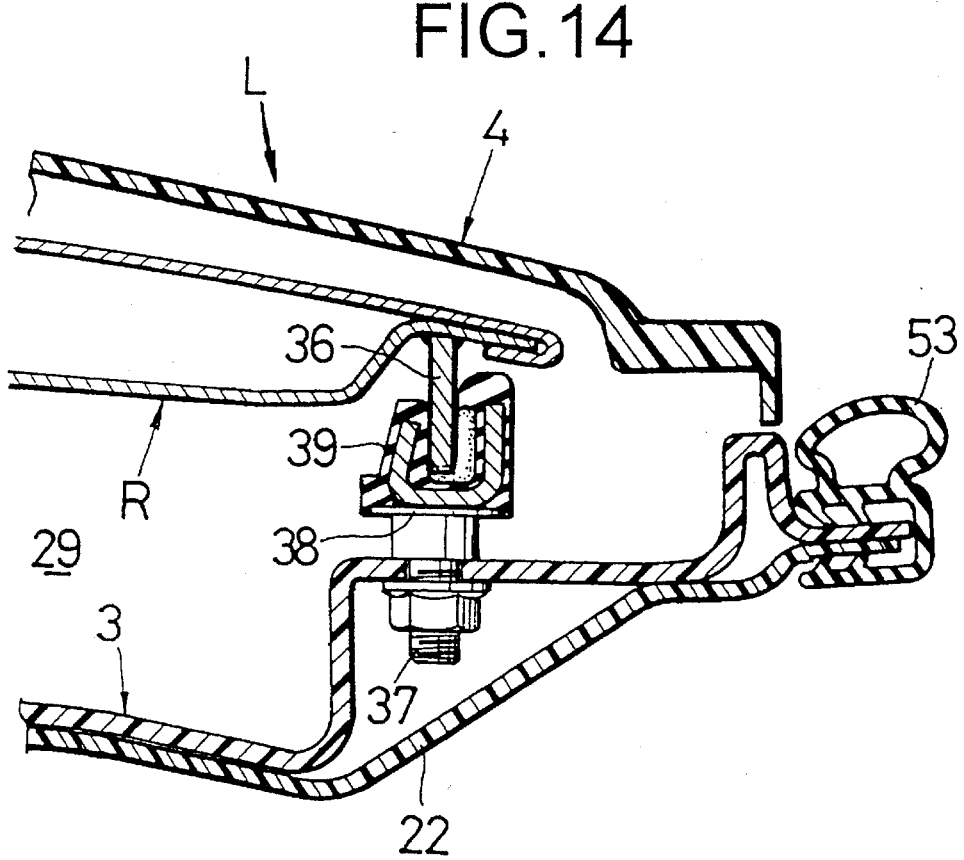
FIG. 14 is an enlarged sectional view taken along a line 14—14 in FIG. 4.

As shown in FIG. 3, the rear glass gate G is swingable about a pivot 1 between a closed position, shown, by a solid line, and an open position, shown by a dashed line, and can be fixed in the closed position by a locking mechanism which is not shown. The maintenance lid L covers an opening in an engine room 2 in which the engine E is accommodated, and includes a lower lid body 3 and an upper cover 4. The lid body 3 and the cover 4 are independently supported pivotally about a common pivot 5 and each is swingable between a closed position, shown by a solid line, and an opened position shown by a dashed line. A space between the rear glass gate G and the maintenance lid L is partitioned from a passenger compartment by a rear window 6 which is formed of a pane of glass to insure a backward view field. An upper surface of the maintenance lid L is set at a level such that it does not obstruct the rearward view field from the inside of the passenger compartment.

The structure of a means for pivotally supporting the maintenance lid L will be described below in detail with reference to FIGS. 4 to 7 and 19.

A pair of left and right hinges 12, 12 are mounted on an upper surface of a vehicle body panel 11 forming a front edge of the opening of the engine room 2. Each of the hinges 12 includes a stationary hinge plate 14 fixed to the vehicle body panel 11 by a plurality of bolts 13. The stationary hinge plate 14 extends obliquely (forwardly and upwardly) and has a hinge pin 15 laterally mounted at a tip end thereof. A movable hinge plate 16 for the lid body is pivotally supported on half of the hinge pin 15 outward of the vehicle body and is secured to an upper surface of a front edge of the lid body 3 by two bolts 17, 17. When the movable hinge plate 16 has been swung from the closed position, shown by the solid line, toward the opened position, shown by the dashed line, an open-limit position thereof is defined by abutment of the movable hinge plate 16 against a stopper 18 secured to a tip end of the stationary hinge plate 12.

A hinge plate 19 for the cover is pivotally supported on the other half of the hinge pin 15 inward of the vehicle body and is secured to a rear surface of a front edge of the cover 4. When the cover 4 has been swung from the closed position, shown by the solid line, toward the opened position, shown by the dashed line, an open-limit position thereof is defined by abutment of the movable hinge plate 19 against the stopper 18 secured to the tip end of the stationary hinge plate 14.

Thus, the lid body 3 and the cover 4 of the maintenance lid L are coaxially, pivotally supported by the common hinges 12, 12, and the cover 4 can be swung alone to its opened position, or the cover 4 and the lid body 3 can be swung in unison with each other to their opened positions.

When the lid body 3 is in its closed position, the opening of the engine room 2 is closed by abutment of the lid body 3 from above against a sealing member 21 mounted at end edge of the vehicle body panel 11. An insulator 22 is mounted on a lower surface of the lid body 3 for insulating noise and heat from the engine room 2.

The structure of a means for biasing the cover 4 will be described below in detail with reference to FIGS. 4, 8, 9 and 19.

A torsion bar 23 is mounted along the front edge of the maintenance lid L to bias the cover 4 toward its opened position. The torsion bar 23 includes a crank-like fixing position $23_1$ at a laterally central portion thereof. The fixing portion $23_1$ is secured to the upper surface of the front edge of the lid body 3 by means of a bracket 24 and a bolt 25. A pair of left and right torsion portions $23_2$ and $23_2$ are connected to the fixing portion $23_1$ of the torsion bar 23 and torsionally supported at two points on the front edge of the lid body 3 by means of brackets 26, 26 and bolts 27, 27. A pair of left and right locking portions $23_3$, $23_3$ are formed at outer ends of the torsion portion $23_2$, $23_2$, respectively and locked to the rear surface of the front edge of the cover 4. The locking portions $23_3$, $23_3$ of the torsion bar 23 are biased in a direction indicated by a arrow A in FIG. 8 by resilient forces of the torsion portions $23_2$, $23_2$. As a result, the cover 4 is biased in an opening direction with respect to the lid body 3.

When the cover 4 is in its closed state with respect to the lid body 3, a sealing member 28, mounted to a lower surface of an outer periphery of the cover, abuts against an upper surface of an outer periphery of the lid body 3. This causes a removable roof accommodating space 29, defined within the maintenance lid L, to be sealingly closed so that the removable roof R is protected from heat from the engine and heat from direct rays of the sun.

The structure of a means for supporting the removable roof R will be described below in detail with reference to FIGS. 4, 10 to 14 and 19.

The removable roof R is fixed at two points at its front portion and at two points at its rear portion in a state in which it has been removed from the vehicle body and accommodated within the maintenance lid L. A pair of front support members 30, 30 are projectingly mounted on the lower surface of the removable roof R at its left and right front portions (left and right rear portions in a state in which the removable roof R has been attached to the vehicle body), respectively. Pins 31, 31 are mounted to project rearwardly from a front wall of the lid body 3 for engagement into pin holes $30_1$, $30_1$ formed in the support members 30, 30, respectively. Front cushion members 33, 33 made of rubber are fixed in their rearwardly turned attitudes to mounting bolts 32, 32 fixed to the lid body 3 in the vicinity of the pins 31, 31. Thus, the left and right front portions of the removable roof R can be stably supported by fitting the pin holes $30_1$, $30_1$ of the pair of front support members 30, 30 of the removable roof R over the pair of pins 31, 31 of the lid body 3, and by abutting the support members 30, 30 against the pair of front cushion members 33, 33.

Limit switches 34, 34 are fixed in the vicinity of the pins 31, 31 by three bolts 35. When the removed roof R is accommodated in a proper position within the maintenance lid L, the limit switches 34, 34 with detector $34_1$, $34_1$ urged by the support members 30, 30 are turned On and thus, it is electrically detected that the roof R is in an accommodated state.

A pair of rear support members 36, 36 are projectingly mounted on the lower surface of the removable roof R at is left and right rear portions (left and right front portions in the state in which the removable roof R has been attached to the vehicle body), respectively. Rear cushion members 39, 39, each formed of rubber into a U-shape in section, are mounted on a pair of brackets 38, 38 fixed to the left and right rear portions of the lid body 3 by two bolts 37, 37 in each case. Thus, the left and right rear portions can be stably supported by fitting the pair of front support members 30, 30 of the removable roof R over the pins 31, 31 and then urging the rear portion of the removable roof R downwardly to resiliently fit the pair of rear support members 36, 36 into the rear cushion members 39, 39.

The structure of a mechanism 40 for locking the cover 4 will be described below in detail with reference to FIGS. 4, 15, 16 and 19.

The locking mechanism 40 mounted on the lower surface of a rear portion of the lid body 3 includes a guide member 44 sandwiched between an upper housing 41 and a lower housing 42 and fixed by two bolts 43, 43. A locking member 46, biased rearwardly by a spring 45, is longitudinally slidably carried in a guide groove $44_1$ which is longitudinally defined in the guide member 44. A portal striker 47 is secured to the lower surface of the cover at its rear portion, so that the cover 4 is locked in a closed position shown in FIG. 15 by engagement of the striker 47 with the locking member 46 to project downwardly from the opening $3_1$ provided in the lid body 3.

The locking member 46 has a hook $46_1$ projectingly provided on a lower portion thereof to project downwardly from a slit $42_1$ which is provided in the lower housing 42. A Bowden wire 50 is comprised of an outer cable 48 and an inner cable 49 which is connected to the hook $46_1$. Thus, the locking member 46 can be separated from the striker 47, so that the cover 4 can be swung in an opening direction by a resilient force of the torsion bar 23. The locking member 46 also has a slant $46_2$ formed on its upper surface at its rear end, and the lower end of the striker 47 is abutable against the slant $46_2$.

Figure 15:
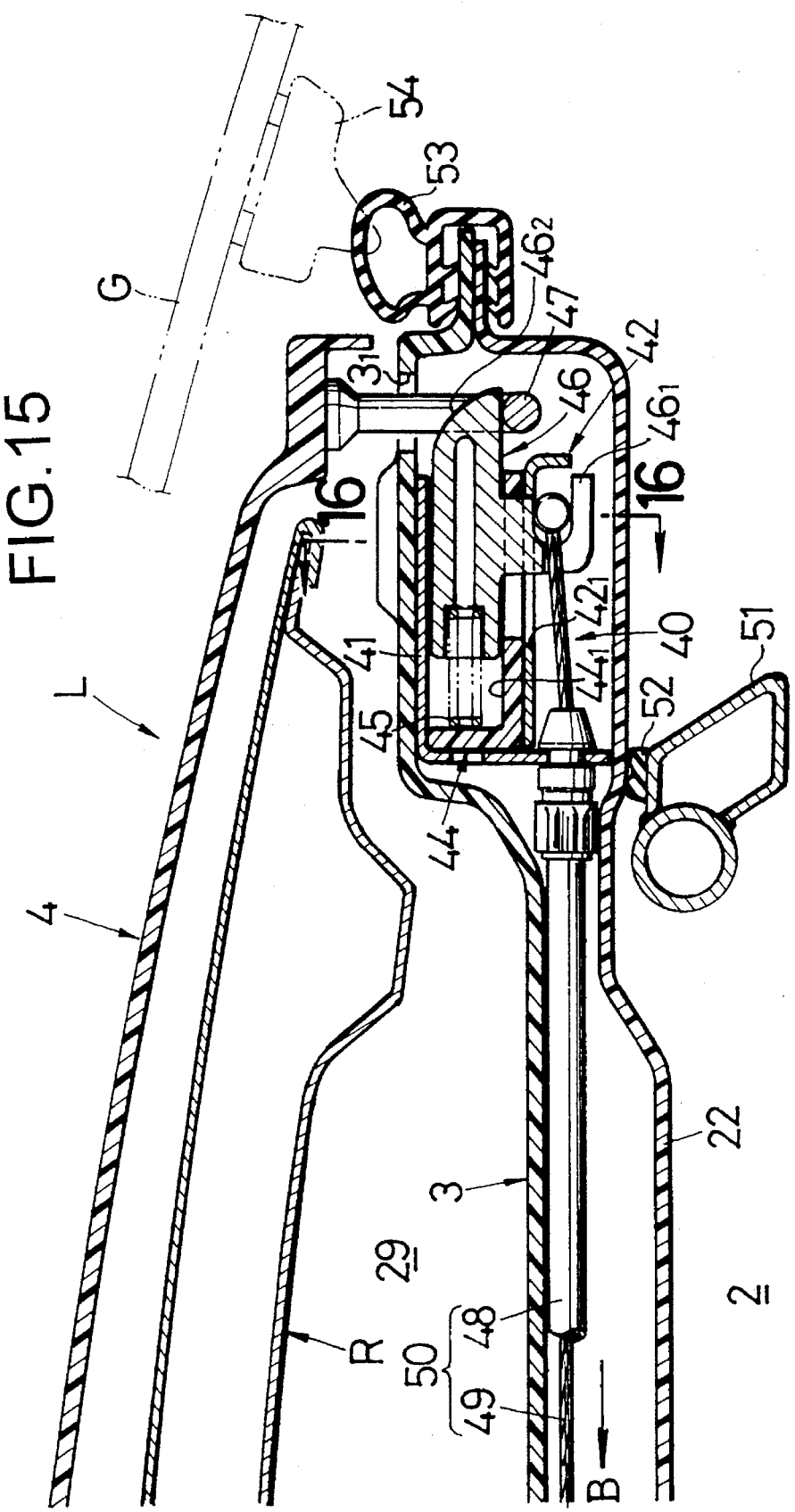
FIG. 15 is an enlarged sectional view taken along a line 15—15 in FIG. 4.
Figure 16:
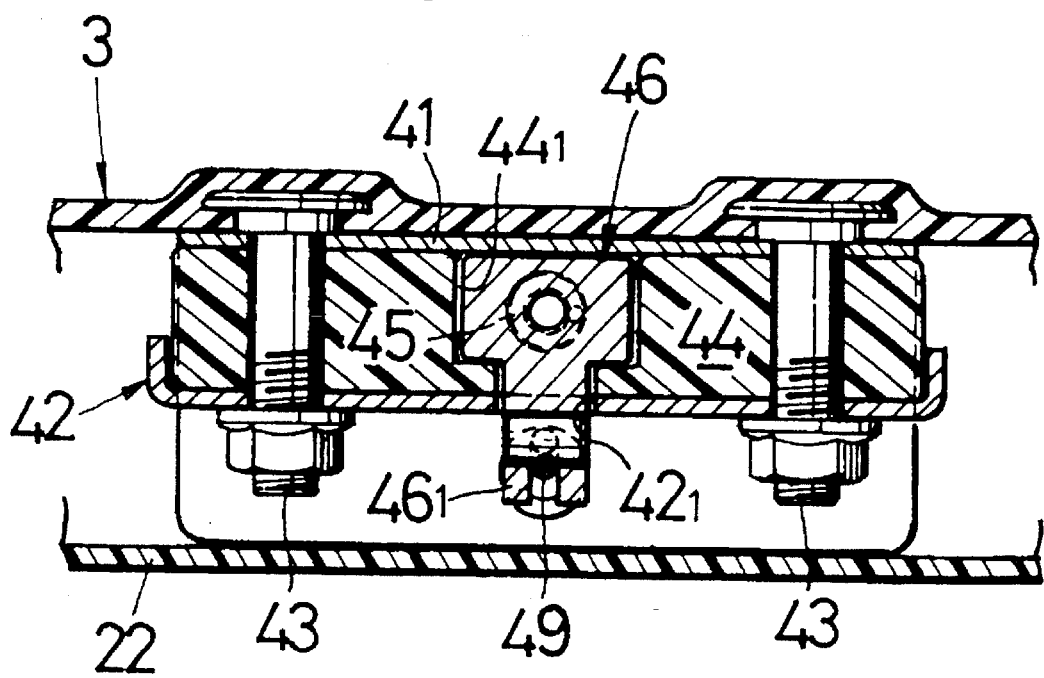
FIG. 16 is a sectional view taken along a line 16—16 in FIG. 15.
Figure 17:
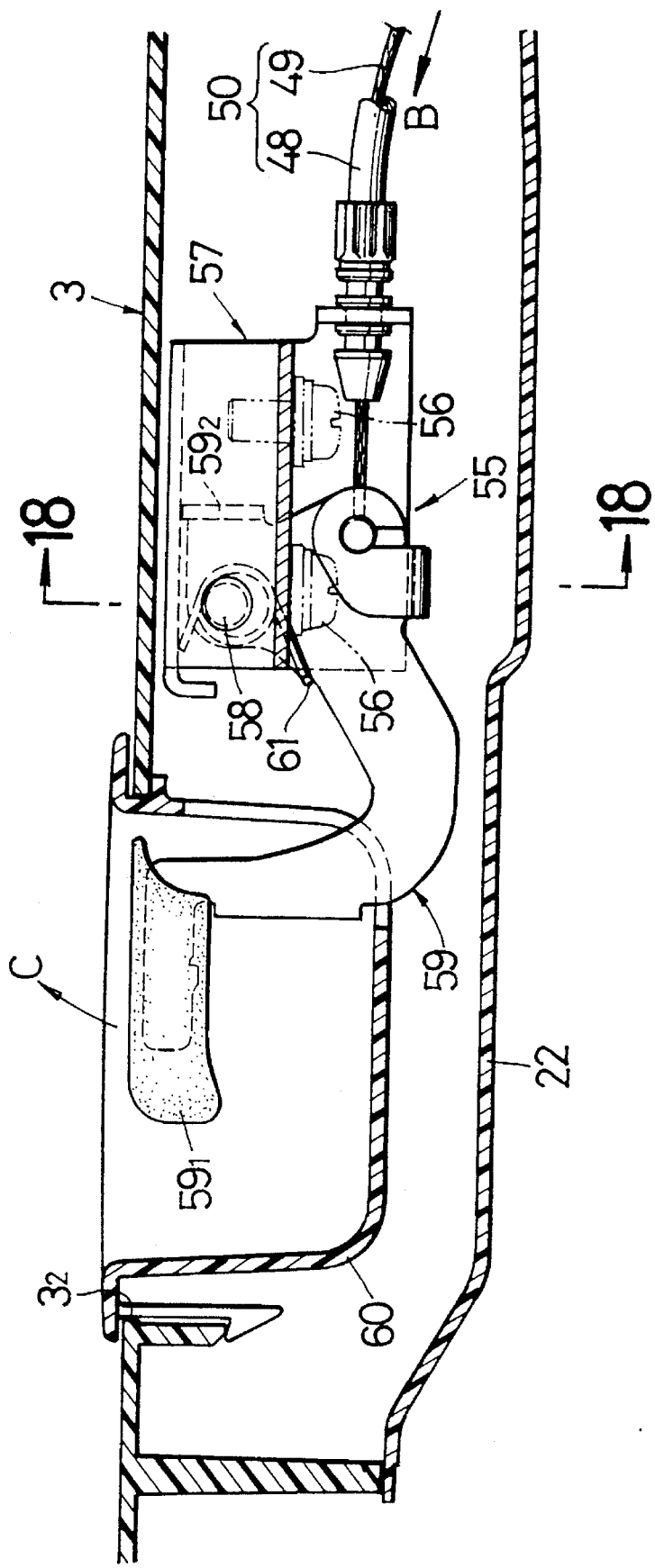
FIG. 17 is an enlarged sectional view taken along a line 17—17 in FIG. 4.
Figure 18:
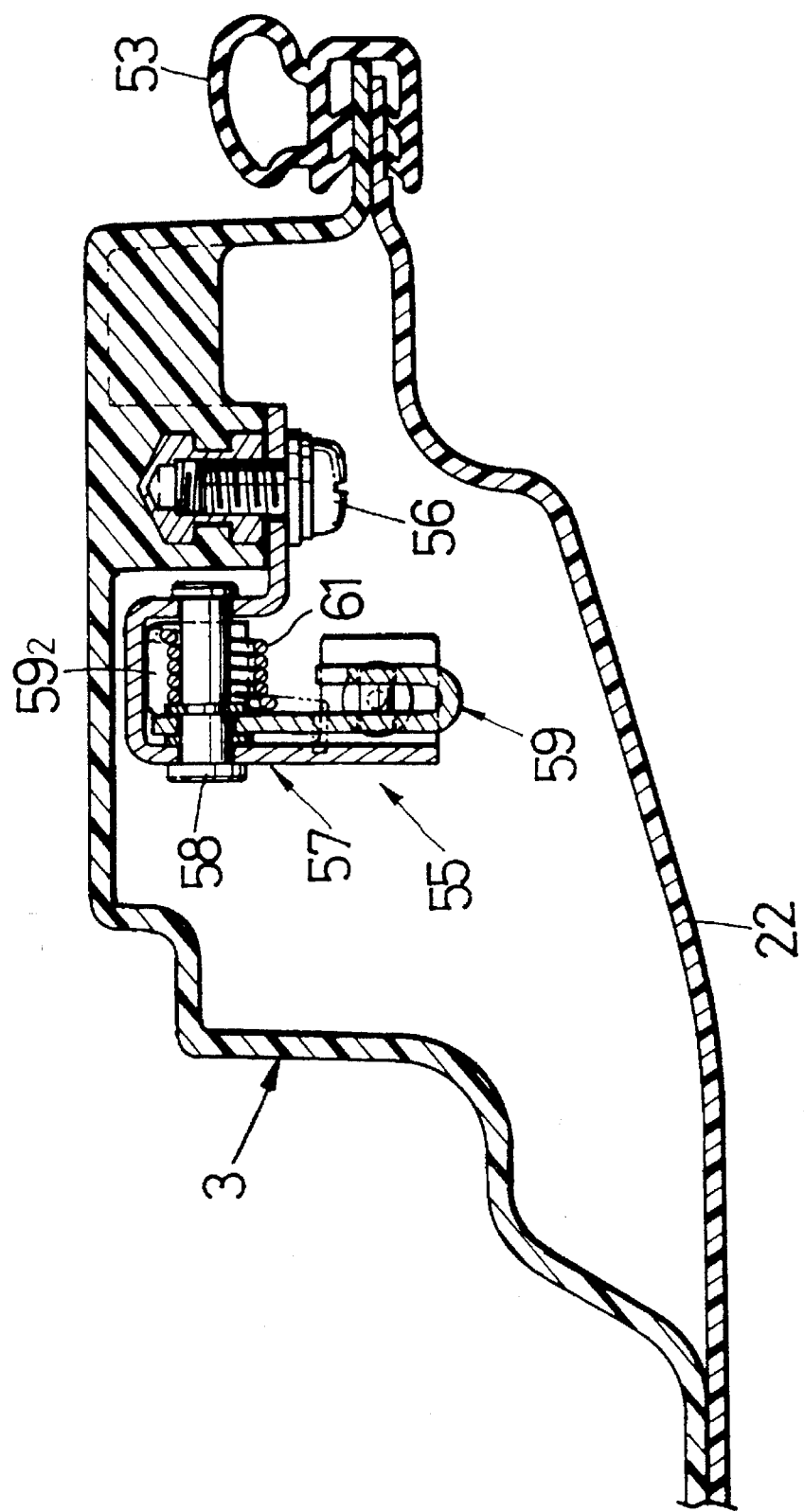
FIG. 18 is a sectional view taken along a line 18—18 in FIG. 17.

As can be seen from FIG. 15, a sealing member 52, for supporting a lower surface of the insulator 22 of the lid body 3, is mounted on an upper surface of a cross member 51 which is mounted in a laterally suspended manner at the rear portion of the engine room 2. A sealing member 54 is mounted on the lower edge of the rear glass gate G to urge a sealing member 53, mounted on the upper surface of the lid body 3 at its rear edge, from above. Thus, by closing the rear glass gate G, the sealing member 54 on the rear glass gate G can be brought into close contact with the sealing member 53 on the lid body 3, while the lower surface of the insulator 22 can be brought into close contact with the sealing member 52 on the cross member 51, thereby fixing the lid body 3 at its closed position. Since the cover 4 is fixed to the lid body 3 by the locking mechanism 40, both the lid body 3 and the cover 4 of the maintenance lid L are fixed in their closed positions.

The structure of the mechanism 55 for unlocking the cover 4 will be described below in detail with reference to FIGS. 4 and 17 to 19.

The unlocking mechanism 55 includes a support bracket 57 secured to the lower surface of the lid body 3 by two bolts 56, 56. An operating lever 59 is pivotally supported on the support bracket 57 by a pin 58 and has an operating portion $59_1$ extending into a cup member 60 which is fitted in the opening $3_2$ provided in the lid body 3. The operating lever 59 is biased by a resilient force of a spring 61 supported around an outer periphery of the pin 58 to a shown position in which a stopper $59_2$ abuts against the support bracket 57. When an operator's finger is placed on the operating portion $59_1$ of the operating lever 59 to pull the operating portion $59_1$ in a direction indicated by an arrow C, the inner cable 49 of the Bowden wire 50, connected to the operating lever 59, is pulled in a direction indicated by an arrow B, thereby operating the locking mechanism 40 to unlock the cover 4.

The operation of this embodiment of the present invention having the above-described construction will be described below.

To accommodate the roof R, which is removed from the vehicle body, into the removable roof accommodating space 29 in the maintenance lid L, the rear glass gate G is first opened to the position shown by the dashed line in FIG. 3. Then, the operating lever 59 of the unlocking mechanism 55, provided at a left side of the lid body 3 of the maintenance lid L, is pulled (see FIG. 17), thereby separating the locking member 46 of the locking mechanism 40 from the striker 47 to release the cover 4 of the maintenance lid L from the lid body 3 (see FIG. 15). This causes the cover 4, biased by the resilient force of the torsion bar 23, to be swung toward the opened position shown by the dashed line in FIG. 7, and to be stopped at the open-limit position in which the movable hinge plates 19, 19 of the hinges 12, 12 abut against the stoppers 18, 18.

After the cover 4 is opened in this manner, the pin holes $30_1$, $30_1$ in the front support members 30, 30 of the removed roof R are fitted over the pins 31, 31 (see FIG. 10), and the rear support members 36, 36 of the removed roof R are press-fitted into the rear cushion members 39, 39 (see FIG. 14), thereby stably fixing the roof R in the roof accommodating space 29.

When the cover 4 is swung to the closed position after accommodation of the roof R, the striker 47 urges the slant $46_2$ of the locking member 46 to move the locking member 46 against the resilient force of the spring, thereby causing the striker 47 to be brought into engagement with the locking member to lock the cover 4 at the closed position (see FIG. 15).

With the cover 4 closed, the roof accommodating space 29 in the maintenance lid L is sealed by the sealing member 28 (see FIGS. 8 and 9) and therefore, the roof can be protected from heat from direct rays of the sun and heat from the engine E.

To conduct maintenance on the engine E, the rear glass gate G may be opened and then, the maintenance lid L with the lid body 3 and the cover 4, integral with each other, may be swung toward its opened position without releasing of the locking of the cover 4 by the locking mechanism 4. At this time, the maintenance lid L is stopped at the open-limit position in which the movable lid body hinge plates 16, 16 and the movable cover hinge plates 19, 19 of the hinges 12, 12 abut together against the stoppers 18, 18 (see FIGS. 6 and 7). When the maintenance lid L is opened to conduct maintenance on the engine E, the roof R may be either accommodated or not accommodated within the maintenance lid L.

Thus, since the roof R is accommodated within the maintenance lid L, the volume of a trunk or a passenger compartment is not sacrificed by the accommodation of the roof R. Moreover, the removal and accommodation of the roof R can be conducted by opening only the cover 4 of the maintenance lid L, and maintenance on the engine E can be conducted by opening the lid body 3 and the cover which remain integral with each other.

Although the embodiment of the present invention has been described in detail, it will be understood that the present invention is not limited to the above-described embodiment, and various modifications may be made without departing from the spirit and scope of the invention defined in claims.

What is claimed is:

1. A removable roof accommodating structure in a midship-type vehicle, comprising:

a maintenance lid capable of opening and an engine mounted in a rear portion of a vehicle body; and a rear gate capable of opening and closing, said engine being covered at an upper portion thereof with said maintenance lid, and said maintenance lid being covered at an upper portion thereof with said rear gate, wherein said maintenance lid includes a lower lid body and an upper cover, each of which is pivotally supported by a hinge means for opening and closing independently, and wherein a removable roof accommodating space is formed between said lower lid body and said upper cover for accommodating a removable roof removed from the vehicle body.

2. A removable roof accommodating structure in a midship-type vehicle according to claim 1, wherein said upper cover is biased in an opening direction with respect to said lower lid body by a biasing means.

3. A removable roof accommodating structure in a midship-type vehicle according to claim 1, wherein said hinge means includes a stopper for defining an open-limit position for both said lower lid body and said upper cover.

4. A removable roof accommodating structure in a midship-type vehicle according to claim 1, wherein said structure further includes a locking mechanism for fixedly locking said upper cover to said lower lid body.

5. A removable roof accommodating structure in a midship-type vehicle according to claim 1, wherein an outer periphery of said upper cover is in abutment against said lower lid body through a sealing member.

6. A removable roof accommodating structure in a midship-type vehicle according to claim 1, wherein said removable roof accommodating space includes support means for supporting said removable roof.

7. A removable roof accommodating structure in a midship-type vehicle according to claim 1, further comprising an insulator mounted on a lower surface of the lid body.

8. A removable roof accommodating structure in a midship-type vehicle according to claim 1, wherein said hinge means includes a hinge pin, a stationary hinge plate fixed to a vehicle body panel, a movable hinge plate for the lower lid body and a hinge plate for the upper cover.

9. A removable roof accommodating structure in a midship-type vehicle according to claim 2, wherein said biasing means is a torsion bar.

10. A removable roof accommodating structure in a midship-type vehicle according to claim 4, further comprising a means for unlocking said locking mechanism.

11. A removable roof accommodating structure in a midship-type vehicle according to claim 1, further comprising means for detecting when the roof is in an accommodated state.

* * * * *